(12) United States Patent
Gibbings

(10) Patent No.: US 6,885,675 B1
(45) Date of Patent: Apr. 26, 2005

(54) DATA TRANSPORT SYSTEM

(75) Inventor: Christopher John Gibbings, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/622,343

(22) PCT Filed: Mar. 15, 1999

(86) PCT No.: PCT/GB99/00757

§ 371 (c)(1),
(2), (4) Date: Aug. 16, 2000

(87) PCT Pub. No.: WO99/48301

PCT Pub. Date: Sep. 23, 1999

(30) Foreign Application Priority Data

Mar. 16, 1998 (EP) ............................. 98301959

(51) Int. Cl.$^7$ .................................................. H04J 3/17
(52) U.S. Cl. .................... 370/433; 370/395.2; 370/421; 725/63
(58) Field of Search .............................. 370/395.1, 278, 370/433, 395.2, 421, 397, 46, 352, 486, 401; 725/4, 127, 63, 111, 114; 348/12, 9; 709/247, 239; 379/93.02

(56) References Cited

U.S. PATENT DOCUMENTS

| | | | | |
|---|---|---|---|---|
| 5,109,286 A | * | 4/1992 | West et al. ................... | 725/127 |
| 5,505,901 A | * | 4/1996 | Harney et al. ................. | 725/4 |
| 5,528,283 A | | 6/1996 | Burton ......................... | 725/116 |
| 5,608,446 A | * | 3/1997 | Carr et al. .................... | 725/114 |
| 5,608,726 A | * | 3/1997 | Virgile ........................ | 370/401 |
| 5,627,836 A | * | 5/1997 | Conoscenti et al. ........ | 370/397 |
| 5,651,005 A | | 7/1997 | Kwok et al. ................. | 370/399 |
| 6,065,061 A | * | 5/2000 | Blahut et al. ................ | 709/239 |

FOREIGN PATENT DOCUMENTS

| | | |
|---|---|---|
| EP | 0727883 A2 | 8/1996 |
| WO | WO 97/09827 | 3/1997 |

OTHER PUBLICATIONS

Ishihara et al, "AMICS: ATM–Based Integrated Platform for Multimedia Services", Globecom '95, IEEE Global Telecommunications Conference, Singapore, Nov. 14–16, 1995, vol. 2, Nov. 14, 1995.

Varshney, "Supporting Mobility with Wireless ATM", COMPUTER, vol. 30, No. 1, Jan. 1, 1997, pp. 131–133, XP000657740.

Van der Plas et al, "Demonstration of an ATM–Based Passive Optical Netowrk In the FTTH Trial on Bermuda", Globecom '95, IEEE Global Telecommunications Conference, Singapore, Nov. 14–16, 1995, vol. 2, pp. 988–992.

Jain et al, An Evolvable ATM–Based Video Network Design Supporting Multiple Access Network Technologies, IEEE Communications Magazine, vol. 33, No. 11, Nov. 1, 1995, pp. 58–63.

\* cited by examiner

*Primary Examiner*—John Pezzlo
(74) *Attorney, Agent, or Firm*—Nixon & Vanderhye P.C.

(57) ABSTRACT

An apparatus for an asymmetric data connection comprises a head end router which may be coupled to an ATM PVC, a PSTN modem coupled to the head end router, a plurality of downstream routers each couplable to the ATM PVC via respective ATM interfaces, and a plurality of downstream PSTN modems each coupled to a respective downstream router via a respective serial interface. Each ATM interface of each respective downstream router is allocated, in use, a respective IP address in a single subnet. Each serial interface of each respective downstream router is allocated in use, a respective IP address in a single subnet. A method of establishing an asymmetric data connection is also described.

19 Claims, 2 Drawing Sheets

DATA TRANSPORT SYSTEM

BACKGROUND

1. Technical Field

The present invention relates to apparatus for a data transport system and more particularly to such apparatus for an asymmetric data connection, and to a method of establishing an asymmetric data connection.

2. Description of Related Art

Increasingly, there is a need for high bandwidth data connections. Frequently, however, the high data bandwidth is only required in one direction. For example, in video-on-demand (unicast) or multicast applications, it is necessary to send high bandwidth video data from a central server to one or more remote users. However, the remote users only need to send low bandwidth signals, for example requesting a particular selection of video data, and thus do not need a high bandwidth return path to the server. In these circumstances, clearly economies may be made by providing a high bandwidth data path from the server at the head end), but providing a relatively low bandwidth return path for data from the remote site to the head end. Thus, the concept of an asymmetric data connection, where the data bandwidths in the outgoing and return paths are not the same, has arisen.

SUMMARY OF EXEMPLARY NON-LIMITING EMBODIMENTS

The present invention is particularly concerned with the type of asymmetric data connection where a high bandwidth path is provided via satellite (typically using asynchronous transfer mode (ATM)) and a low bandwidth return path from a remote site to the head end is provided typically using a PSTN modem.

It will be appreciated that a typical customer of an asymmetric data connection will not require a permanent high bandwidth connection. Thus, it is desirable to be able to switch the high bandwidth connection between different remote users on a time-distributed basis. For example, a user may wish to have a video feed for one hour a day, or may wish to transmit a large amount of data, perhaps to set up a new remote server, on a one-off basis.

Prior art asymmetric connection arrangements have introduced a significant reconfiguration overhead where the identity of the remote receiver or remote user is to be changed. Thus, it has been uneconomic to permit frequent changes of the identity or location of the remote user.

According to the present invention there is provided a data transport system comprising a head end router coupled to a data source, a plurality of downstream routers each for connection to at least one addressablie site and each coupled to the head end router by a high bandwidth forward data path; each of the downstream routers being connectable by a switchable low bandwidth return path, the head end router selecting the return control path from downstream routers by causing set-up of the respective return path to one of the downstream routers.

According to a feature of the invention there is provided apparatus for an asymmetric data connection comprising a head end router coupable to an ATM permanent virtual circuit (PVC) a PSTN modem coupled to the head end router, a plurality of downstream routers each coupable to the ATM PVC via respective ATM interfaces, and a plurality of downstream PSTN modems each coupled to a respective downstream router via a respective serial interface, each ATM interface of each respective downstream router being allocated, in use, a respective IP address in a single subnet, and each serial interface of each respective downstream router being allocated, in use, a respective IP address in a single subnet.

By arranging for the ATM interfaces and the serial interfaces each to be allocated IP addresses in the same respective subnet IP routing is simplified. Thus, a changeover of intended recipient of data passing along the ATM PVC is readily achieved.

Preferably each downstream router is arranged to receive data over the same PVC, the IP address carried with the ATM data being used by each downstream router to determine whether the data is valid for that user. This avoids the need to change the configuration of the PVC each time a different customer at a downstream router requires data via the ATM connection. Since the ATM pipe between the head end router and the downstream routers is likely to pass through several switches, there would be a significant reconfiguration and checking overhead should the PVC need reconfiguring each time the user changed.

The head end router may include a modem address mapping table operable to map the IP address of each of the said serial interfaces to the respective downstream PSTN to which each serial interface is connected. This allows the head end router to dial the relevant PSTN modem connected to the serial interface of the downstream router when data for the IP address of the relevant serial interface is received.

By arranging for the head end router to dial the downstream router (rather than vice versa), the head end router has control over the PSTN link, which means that one customer's modem call does not block out the next customer's call. As a corollary to this, the modems on the downstream routers should preferably be arranged not to attempt to dial the head end router since doing so could block calls being made from the head end router to another downstream router.

Preferably, the head end router is arranged to cause the head end PSTN modem to establish a connection with a predetermined one of the downstream PSTN modems using the modem address mapping table when, in use, a predetermined activation packet is received by the head end router for routing to the IP address of one of the serial interfaces.

Thus, to activate a connection with a particular downstream router, it is only necessary to send an activation packet to the head end router having an IP address of one of the serial interfaces of the downstream router. The activation packet may, for example, be a "ping" packet. Receipt by the head end router of the activation packet causes it to dial the relevant downstream router (via the PSTN modems) and establish a connection over the PSTN. Thereafter, the downstream router may request information using the PSTN link, and the information may be transmitted as data over the high bandwidth ATM link.

The particular advantage of this arrangement is that it is only necessary to send an activation packet in order to change which user is in control of the ATM link. The head end router may receive the activation packet, for example from a network management workstation.

Preferably the predetermined activation packets are supplied to the head end router according to a predetermined timetable. For example, a network management workstation may store a timetable which changes each user every hour. To achieve the changeover, a predetermined activation packet is sent to the head end router. In a preferred embodiment, the activation packets may be sent at predetermined intervals to ensure that the PSTN link has not been dropped. The head end router is configured to cause re-dialling of the downstream router if the PSTN link has been dropped. Alternatively, if the IP address of the activation packet is no different to the previous IP address, and the PSTN link is still active, the router need not re-dial but may simply send the activation packet along the already established PSTN link to the PSTN modem of the relevant downstream router.

Preferably, the head end router includes an ATM address mapping table operable to map the IP address of each of the said ATM interfaces to a predetermined ATM virtual channel identifier (VCI) and virtual path identifier (VPI). In this way, all data addressed to the IP addresses of the ATM interfaces is directed along a single PVC by the head end router. This achieves the advantage of no PVC reconfiguration when users are changed as described above.

According to a second aspect of the feature, a method of establishing an asymmetric data connection comprises establishing a unidirectional ATM connection between a head end router and a plurality of downstream routers, all the downstream routers being connected to the head end router via the same ATM PVC, receiving a predetermined activation packet at the head end router, reading the IP address of the activation packet and extracting connection information from a modem mapping table using the IP address to index the table, and dialling from a PSTN modem connected to the head end router to a PSTN modem connected to one of the downstream routers using the connection information in order to establish a return data connection over the PSTN between the head end router and the downstream router.

Preferably, the ATM interfaces of the downstream routers are allocated respective IP addresses in a common subnet; and, similarly, the modem interfaces of the downstream routers may be allocated respective IP addresses in a common subnet. Preferably, the activation packet is received according to a predetermined timetable.

BRIEF SUMMARY OF THE DRAWINGS

The invention will now be described, by way of example, with reference to the drawing of which.

DETAILED DESCRIPTION OF EXEMPLARY NON-LIMITING EMBODIMENTS

Figure 1:
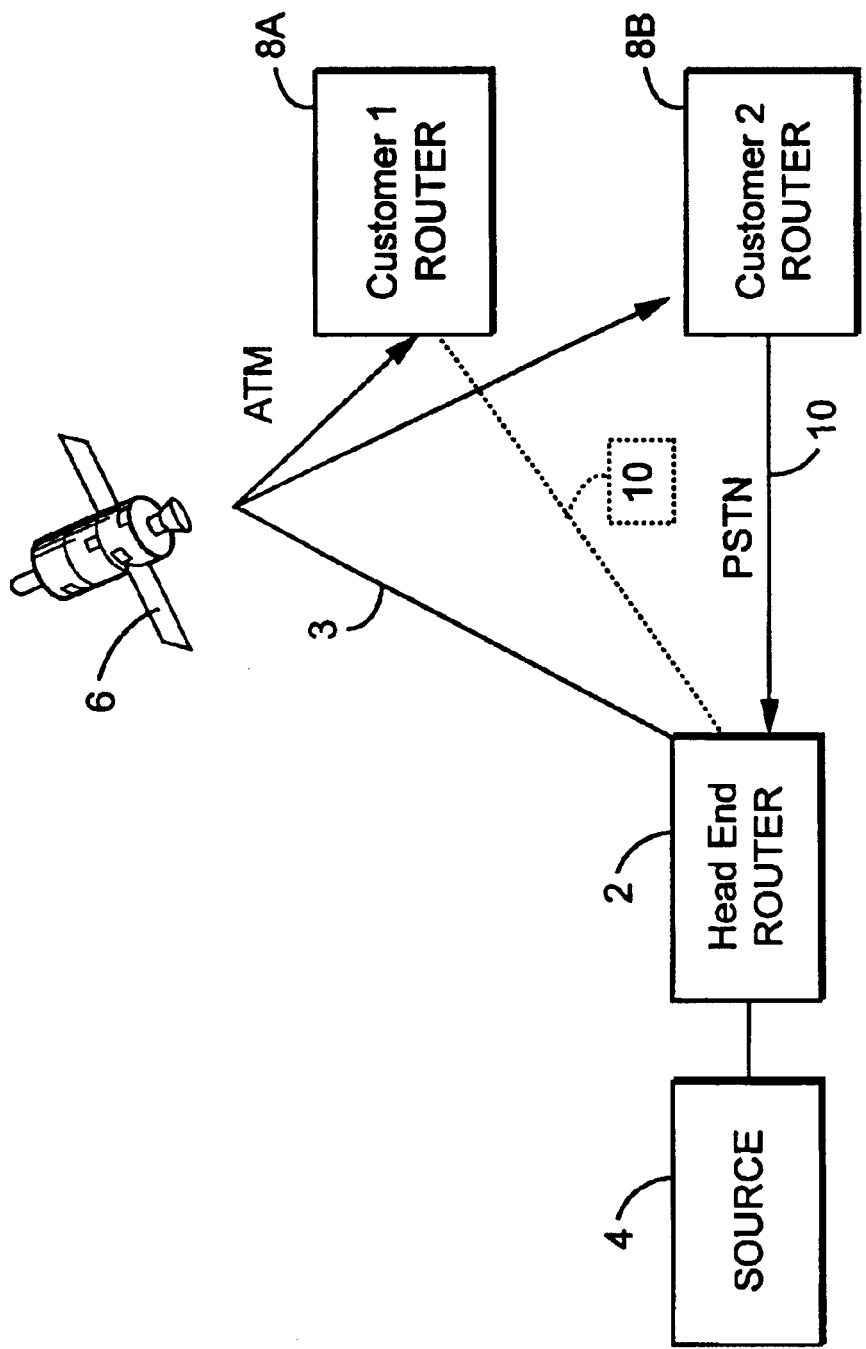
FIG. 1 is a schematic diagram of a head end router and downstream routers arranged in accordance with the invention.

With reference to FIG. 1, a head end router 2 is connected to a data source 4 and, via an ATM Data Service Unit (DSU) (not shown), to a satellite 6. Downstream routers 8A, 8B are also coupled via ATM DSUs to the satellite 6 and to the head end router 2 via a PSTN return link 10.

In the drawing, the return link 10 between the downstream router 8A and head end router 2 is shown in dotted lines since this is a possible link between the two routers but is not active. The active link is that between the downstream router 8B and the head end router 2.

All downstream routers (only two downstream routers are shown, but this should be taken to exemplify any number of downstream routers, for example, up to twenty) are set to listen on the same ATM PVC. The downstream routers 8A, 8B include modems which are set to receive incoming calls, but not to dial out.

The head end router 2 is configured so that it will dial the appropriate downstream modem when an activation packet is destined for that router's IP address. The activation packet typically will be a "ping" IP packet.

Activation packets are generated by the data source 4 which may, for example, include a network management workstation and are generated when it is desired to change the customer. Activation packets may also be generated on a periodic basis in order to ensure that the PSTN return link is still active.

By way of example, typical examples of IP address allocation for the head end router 2 are shown below.

For the ATM interface, one subnet is allocated with an IP number for the head end, and with an IP number for each potential customer. The mapping maps each IP address of the potential customers to only one PVC. The statements might be as follows:

ip 10.1.1.2 atm-vc 111 broadcast
Ip 10.1.1.3 atm-vc 111 broadcast
Ip 10.1.1.4 atm-vc 111 broadcast Thus, all IP addresses of the ATM interfaces of the downstream routers 8A, 8B etc. are mapped to VC 111. The label "111" refers to a particular VCI/VPI combination defined elsewhere in the head end router configuration. This allows each of the downstream routers 8A, 8B etc. to "listen" only to one ATM PVC.

The serial (PSTN) interface of the head end router 2 is allocated with one subnet with an IP number for the head end, and with an IP number for each potential customer as shown below. #A, #B, #C etc. are the respective modem telephone numbers of the downstream PSTN modems. Thus, the sending of an activation packet causes the head end router 2 to dial the relevant telephone number of the relevant modem according to the above mapping. In this way, the PSTN return link 10 is set up with a particular downstream router 8A, 8B etc.

dialler map ip 10.1.2.2 name A modem-script dnum #A
dialler map ip 10.1.2.3 name B modem-script dnum #B
dialler map ip 10.1.2.4 name C modem-script dnum #O In use, to establish a link with a particular customer, an activation packet is sent to that customer's PSTN IP address to establish a return link 10. The customer may then make requests for desired data which will be returned to the customer over the ATM link via the satellite 6.

Since all customers are "listening" to the same ATM PVC, the only change which is required to enable a different customer to receive data via the satellite 6 is to send an activation packet having that customer's PSTN IP address. This causes the head end router 2 to dial an alternative modem, and to establish an alternative return link 10.

A range of subnets is allocated for Ethernet, and other interfaces on the downstream interfaces of the downstream routers 8A, 8B. IP routes are arranged to go via the appropriate ATM address. Thus a suitable mapping is:

ip route <A address range>10.1.1.2
ip route <B address range>10.1.1.3

This causes a particular IP address range to be routed via a particular downstream router using the IP address of the relevant ATM interface. Thus, data for downstream interfaces on a particular downstream router will automatically be routed via the correct ATM PVC to the correct downstream router. At the downstream router, all upstream subnets are routed to the modem port. This provides a router for data being send out from the router. However, all addresses allocated to other downstream routers are routed to null. Thus, if data is still being passed over the ATM link via the satellite 6, from a previous customer, the high bandwidth data is not returned over the low bandwidth PSTN link, but instead is routed to null.

The routing to null is necessary because, on changeover of customers, it is possible that a previous customer's data source will continue to send data over the ATM link (i.e. data having the IP address of a particular ATM interface of the customer's downstream router). For simplicity's sake, the head end router 2 does not filter that data, but simply passes it along the ATM link. Thus, if a previous customer's source application is badly behaved, it may continue to send data after its access to the ATM link and its downstream router have ceased. If the downstream router of the present customer were to attempt to pass that data back via the PSTN modem, it would be necessary to buffer large amounts of data at the present customer's downstream router since the data flowing into the router from the ATM link will enter the downstream router at a much higher rate than it can be returned via the PSTN modem. Hence, the need to route all data destined for other downstream routers to null.

The apparatus may be used with multicast data. One feature of multicast data is that the protocol independent multicast (PIM) algorithm attempts to find the shortest route for data, and avoids duplicate routes. It will be appreciated that the router is configured such that the route back to upstream IP addresses is via the PSTN modem (as described above). The PIM algorithm, therefore, will discard multicast packets received via the ATM link, since it will prefer multicast packets received via the PSTN link which is configured as the direct route back to the source of the multicast packets. Clearly, this is undesirable, since the ATM link with its high bandwidth is much better suited to the transmission of multicast packets to the downstream router. In order to overcome this problem, multicast packets are "tunnelled", in the sense that those packets are wrapped inside unicast packets. This has the effect of allowing multicast packets to be routed along the ATM link without PIM discarding them on receipt.

A tunnel is allocated to each customer. Each tunnel runs from a common IP address on the head end router 2 to the loop back interface on each downstream router.

In operation, all tunnel and routes are left active all the time. To select a particular customer, a ping packet is sent to the relevant PSTN IP address. Once the line is active, the customer can route packets back to the head end. This means that unicast applications like FTP begin to work immediately. The tunnel interface mentioned above, becomes active as a PIM neighbour and multicast begins to work.

To select another customer, the head end router 2 pings the new customer, thereby disconnecting the first customer, because the return PSTN link is dropped when the new customer is dialled by the head end router.

To maintain the link to a particular customer for a desired length of time, the following three strategies may be used:
1. Set the time-out to be very long on th e PSTN interface, and terminate sessions by pinging an alternative customer;
2. Set all traffic to be activation packets, so that the interface never times out, and again ping an alternative customer to terminate the first customer; or
3. Set the timer reasonably short, a nd keep the PSTN interface active by pinging at intervals shorter than the time-out of the interface.

At the customer end, when an incoming modem line becomes active, all unicast applications begin to work. After a short time delay (typically about 2 minutes), multicast applications will begin to work. The time delay is caused because three PIM updates are required before the network accepts that a new multicast node is active. The PIM updates are sent at 30 second intervals, and thus at least 90 seconds must elapse before multicast applications will begin to work.

It will be appreciated that PIM updates for other customers will be received over the ATM link, since all tunnels have a common start point at the head end. It will be noted, however, that the traffic level will be low as a result of these PIM updates, and also that all traffic for other downstream routers is routed to null as mentioned above.

Sensitive data may be encrypted, so that it cannot be read by other receivers, since it will also be appreciated that all routers receive data for all customers. However, the data will only be available outside the downstream router if it is destined for a downstream IP address according to the mapping described above. Thus, only if the security of the router is cracked, will customers be able to receive other customers' data. This also applies to multicast streams for other customers, since they will have the "wrong" unicast address, and cannot be received by another customer unless the router configuration is changed.

As mentioned above, if data is particularly sensitive, it may be encrypted and public keys may be exchanged between the head end router 2 or the data source 4 and the downstream router or data sink.

Optionally, multiple users may receive multicast broadcasts, although only one user may have access to the PSTN return link and, therefore, will have control over what data is sent over the multicast link.

Thus it will be appreciated that the present invention avoids the need for complicated changeover procedures, it avoids the risks associated with frequent reconfigurations (which is especially difficult when reconfiguring remote sites), it makes efficient use of IP address space compared to individual subnets allocated to each downstream router, and it is able to cope with both unicast and multicast traffic.

Figure 2:
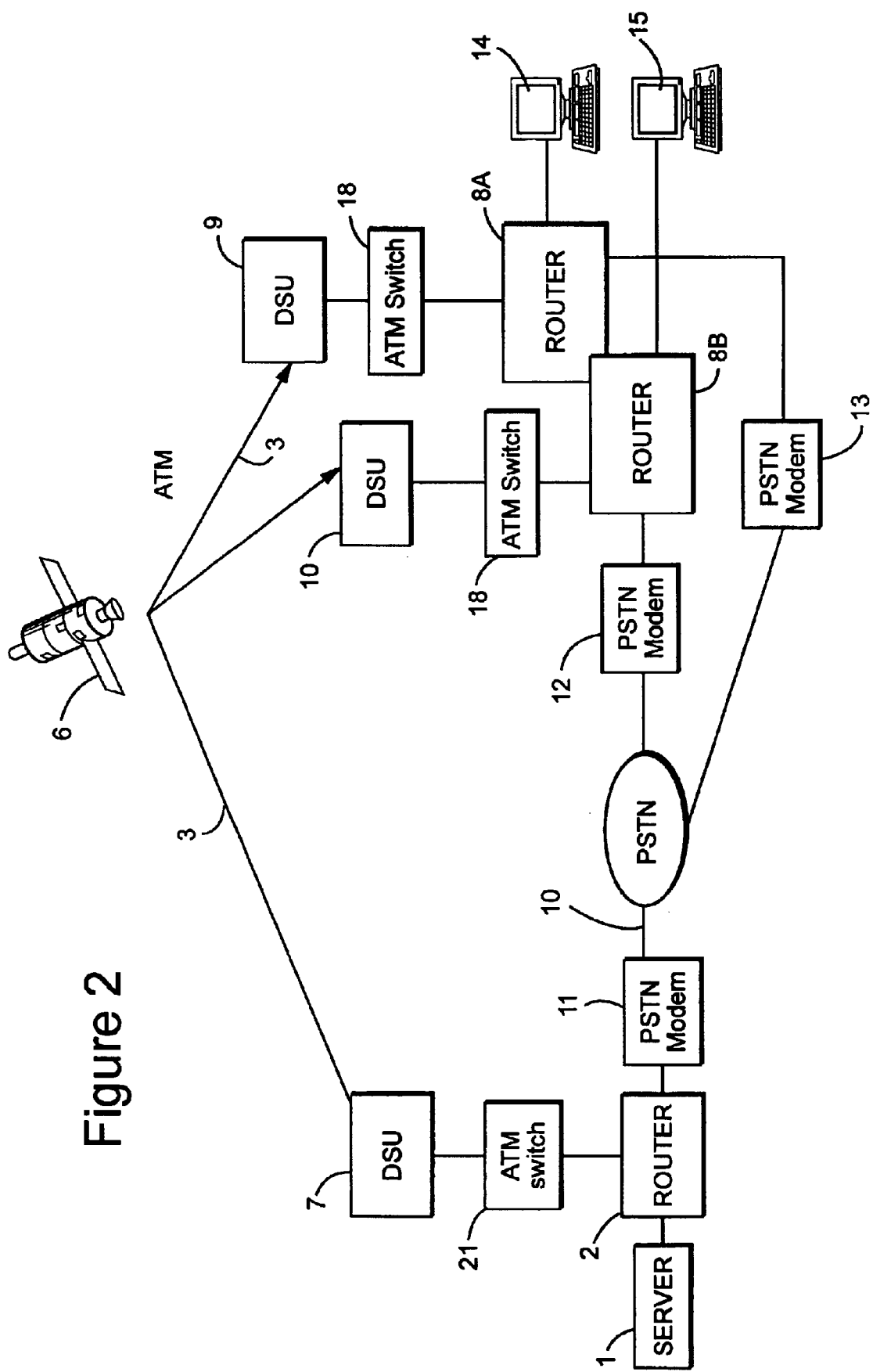
FIG. 2 shows the arrangement of FIG. 1 in greater detail.

Turning now to FIG. 2, an information source 1 is connected, by way of a head-end router 2, to one or more routers 8A, 8B, for connection to individual customers. Each customer has an "IP address". IP addresses allow data to be directed to the appropriate user, and follow a hierarchical structure, in which individual users are allocated to individual addresses within "subnets". The downlink for transmitting information to the users is made by way of an ATM link 3, (typically via a satellite 6) but the return, control, channels are made by a PSTN link 10.

Typically, the system includes asymmetric routing for unicast packets. Multicast packets are "tunnelled" from the head end 2 to the downstream router 8A, 8B. Tunnelling is a process by which the multicast packets are made to appear to the network as ordinary packets, e.g. by "wrapping" them in normal header information. Return traffic over the PSTN modem link is at a relatively low level, and comprises PIM (protocol-independent multicast) updates, multicast requests, etc.)

In the time-shared user system shown in FIG. 2, both customers get the ATM feed 3 ail the time, but only one can have access to the PSTN return path at any given time.

There are several potential problems with time sharing. Firstly, the PSTN lines must be managed to ensure that one customer's modem call does not block out the next customer's call. Secondly, customer lines will tend to be kept up by PIM updates, which are typically made every 30 seconds to identify whether the user is still online. They have to be actively cut off if a second customer requires to use the line. Thirdly, if the mechanism for moving customers from one location to another involves configuration changes they will have to be completed in full and checked every single time, with a mechanism for dealing with problems, for example if the downstream router is accidentally configured so that the head end cannot dial in.

For the sake of example, the system can be embodied using the following equipment, as shown in FIG. 2. The head end router 2 may be a Cisco 4500 with an ATM interface, connected to an 8 Mbit/s ATM DSU (data switching unit) 7 via a chain of Cisco LS1010 switches 21 (only one shown). The ATM signals are then sent over a unidirectional satellite circuit 3. At each receiving station there is a corresponding ATM DSU 9, 10 which sends the data to another Cisco 4500 router 8A, 8B via switches 18. The head end router 2 and remote routers 8A, 8B are also connected via 28.8 kbit/s PSTN modems 11, 12, 13. The server 1 is connected to the head end router by Ethernet or ATM. Client PCs 14, 15 are connected to the downstream routers 8A, 8B by Ethernet.

What is claimed is:

1. A data transport system comprising:
   a head end router coupled to a data source; and
   a plurality of downstream routers each for connection to at least one addressable site and each coupled to the head end router by a common high bandwidth forward data path;
   each of the downstream routers being connectable by a switchable low bandwidth return path, the head end router selecting the return control path from only one of downstream routers at a time by causing set-up of the respective return path to the only one of the downstream routers; and
   each downstream router receiving data from the common high bandwidth forward data path only when the return path is held connected by the head end router.

2. A data transport system as claimed in claim 1 in which user addresses of remote sites are selected such that all of the remote sites being served are on a single subnet for the forward data path.

3. A data transport system as claimed in claim 1, in which user addresses of remote sites are selected such that all of the remote sites being served are on a single subnet for the switchable return data path.

4. A data transport system as claimed in claim 1, in which the common high bandwidth forward data path is an asynchronous transfer mode (ATM) permanent virtual circuit (PVC).

5. A data transport system as claimed in claim 4, in which the PVC includes, at least in part, a link through a satellite broadcast channel.

6. A data transport system as claimed in claim 1, in which the switchable return path is a public switched telephone network (PSTN) path.

7. A data transport system as claimed in claim 1, in which the head end router packages multicast messages within an addressed data packet whereby multicast data is tunnelled from the head end to one or more respective remote sites.

8. An apparatus for a data transport system using an asymmetric data connection, the apparatus comprising:
   a head end router coupable to an ATM PVC;
   a PSTN modem coupled to the head end router;
   a plurality of downstream routers each coupable to the ATM PVC via respective ATM interfaces; and
   a plurality of downstream PSTN modems each coupled to a respective downstream router via a respective serial interface;
   each ATM interface of each respective downstream router being allocated, in use, a respective IP address in a single subnet, and each serial interface of each respective downstream router being allocated, in use, a respective IP address in a single subnet, control of the receiving downstream router being activated by the head end router.

9. An apparatus according to claim 8, in which the head end router includes a modem address mapping table operable to map the IP address of each of said serial interfaces to the respective downstream PSTN modem to which each serial interface is connected.

10. An apparatus according to claim 9, wherein the head end router is arranged to cause the PSTN modem coupled to the head end router to establish a connection with a predetermined one of the downstream PSTN modems using the modem address mapping table when a predetermined activation packet is received by the head end router for routing to the IP address of one of the serial interfaces.

11. An apparatus according to claim 10, wherein at least the predetermined activation packet is supplied to the head end router according to a predetermined timetable.

12. An apparatus according to claim 8, wherein the head end router includes an ATM address mapping table operable to map the IP address of each of said ATM interfaces to a predetermined ATM VCI and VPI.

13. A method of establishing an asymmetric data connection, the method comprising:
   establishing a unidirectional ATM connection between a head end router and a plurality of downstream routers, all of the downstream routers being connected to the head end router via the same PVC,
   receiving a predetermined activation packet at the head end router, and
   reading the IP address of the activation packet and extracting connection information from a modem mapping table using the IP address to index the table and dialling from a PSTN modem connected to the head end router to a PSTN modem connected to one of the downstream routers using the connection information in order to establish a return data connection over the PSTN between the head router and the downstream router, the downstream router receiving data only when a return connection is established between the head end router and the downstream router.

14. A method according to claim 13, wherein ATM interfaces of the downstream routers are allocated respective IP addresses in a common subnet.

15. A method according to claim 13, wherein modem interfaces of the downstream routers are allocated respective IP addresses in a common subnet.

16. A method according to claim 13, wherein the activation packet is received according to a predetermined timetable.

17. A data transport system as in claim 1, wherein each of the downstream routers includes a modem that receives incoming calls but does not dial out.

18. An apparatus as in claim 8, wherein each of the plurality of the downstream PSTN modems receive an incoming call from the PSTN modem coupled to the head end router but does not dial out.

19. A method as in claim 13, wherein each of the PSTN modems connected to one of the downstream routers receives an incoming call from the PSTN modem connected to the head end router but does not dial out.

* * * * *